Jan. 7, 1969   J. F. JASOVSKY   3,420,546

TRACTOR-TRAILER HOSE INTERCONNECTION

Filed March 31, 1967

United States Patent Office 3,420,546
Patented Jan. 7, 1969

3,420,546
TRACTOR-TRAILER HOSE INTERCONNECTION
Joseph F. Jasovsky, Bayonne, N.J., assignor to Ardmaer Trucking Co., Inc., Bayonne, N.J., a corporation of New Jersey
Filed Mar. 31, 1967, Ser. No. 627,527
U.S. Cl. 280—421        6 Claims
Int. Cl. B60d 1/08; F16l 3/00

ABSTRACT OF THE DISCLOSURE

Tractor and trailer hose interconnection in which the hoses are upwardly looped and connected by resilient means to a carrier movable along a track supported by the tractor cab.

---

This invention relates generally to the interconnection of the hoses which carry air, vacuum or other fluids between a tractor and a trailer. Ordinarily these hoses extend from points of connection at the lower central portion of the rear wall of the tractor cab, go up to a looped spring and then pass downward to points of connection at the lower front portion of the front wall of the trailer. Currently such hoses are usually fourteen feet long and because the braking of the trailer depends upon them, they are very durably made and expensive per lineal foot. When the trailer changes its position with respect to the tractor to high degrees of angularity, for example to a right angle position, the hoses get stretched or abraded. These hoses are subjected to frequent examinations by the Interstate Commerce Commission and by reason of such inspections or otherwise replacement is frequent.

It is therefore among the objects of the present invention to provide structure which avoids the above described conditions, thereby reducing expense and increasing safety.

Another object herein lies in the provision of structure of the class described, in accordance with which, the hoses may be shortened a substantial amount whereby initial and replacement cost when necessary is reduced.

These objects and other incidental ends and advantages will more fully appear in the progress of this disclosure and be pointed out in the appended claims.

In the drawings in which similar reference characters designate corresponding parts throughout the several views.

Figure 1:
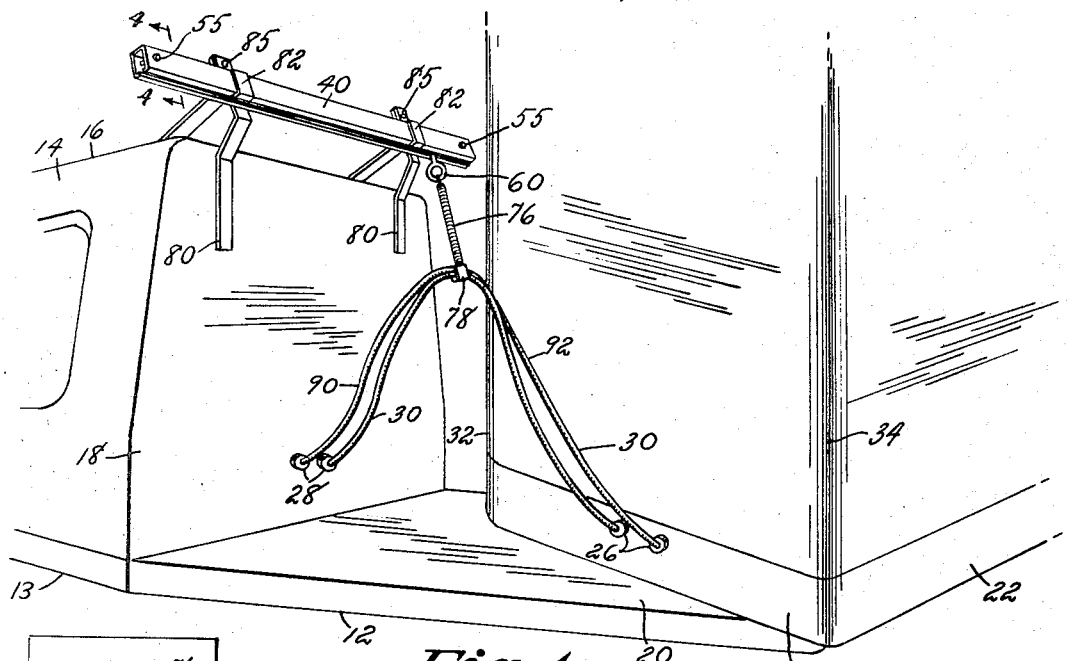
FIGURE 1 is a fragmentary perspective view showing an embodiment of the invention.
Figure 2:
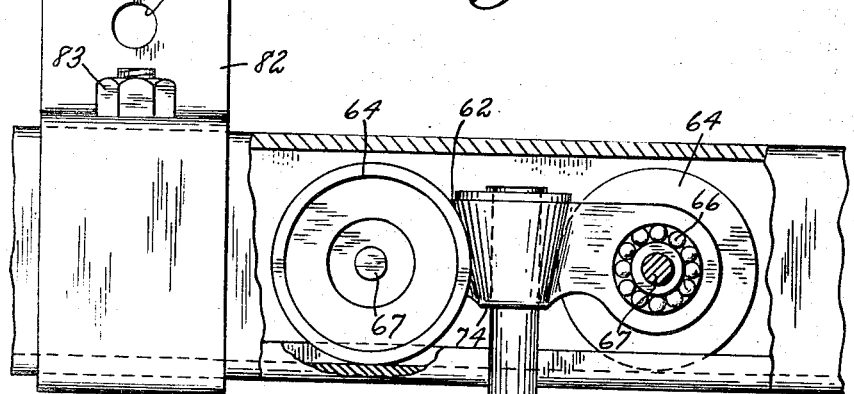
FIGURE 2 is an enlarged fragmentary elevational view of the track element, broken away to show the carrier element.

In accordance with the invention the tractor-trailer combination or vehicle 12 includes a tractor 13 having a cab 14 having a roof or top wall 16, a rear wall 18 and a platform 20 upon which the trailer 22 is pivotally connected in a well known manner (not shown). The trailer 22 has a front wall 24 upon which are mounted trailer hose connections 26. The wall 18 has tractor hose connections 28. The hoses 30 may be of the usual construction except that because they are so well positioned by the present invention that they may be substantially shorter. I have found, for example that where a fourteen foot hose has been in use in a given installation, with my invention in use a twelve foot hose will operate satisfactorily.

Figure 4:
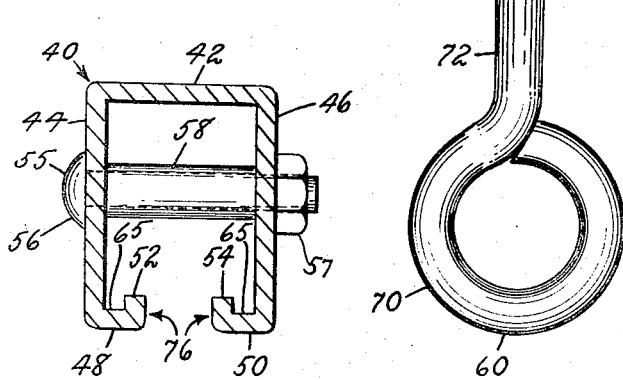
FIGURE 4 is an enlarged sectional view as seen from the plane 4—4 in FIGURE 1.

The track means 40 is preferably rectilinear and extends generally transversely of the cab 14 and hence transversely of the normal direction of travel of the vehicle 12. As best seen in FIGURE 4, the track means 40 is preferably of inverted U-shape including a top portion 42, front portion 44, rear portion 46, front track member 48 and rear track member 50. The track members 48 and 50 are preferably substantially U-shaped in cross section including the upward flanges 52 and 54. The ends of the track means are provided with stops 55 for limiting the travel of the carrier element 60, each of said stops may have a bolt 56, nut 57, and collar 58.

Figure 3:
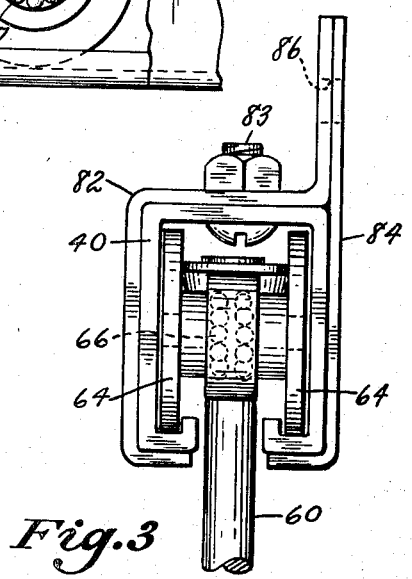
FIGURE 3 is an enlarged end elevational view of the track element and associated parts, as seen from the right end in FIGURE 1, with the end stop removed for clarity.

The track means 40 is mounted on the cab 14 by means of supports 80 which are affixed to cab 14 in any suitable well known manner, the track means 40 being connected to the supports 80 by pairs of brackets 82 and 84 which are of irregular shape best seen in FIGURE 3. Brackets 82 are connected to top portion 42 by bolts 83 while brackets 82–84 are held together and secured to the supports 80 by bolts 85 passing through holes 86. As seen in FIGURE 1 the track means 40 is arranged at an angle, the axis of which bisects a majority of the angles formed by the portions 90 and 92 of the upwardly looped hoses 30 during travel, parking, loading and unloading of the vehicle 12. This distributes the load on the carrier element 60 so that it is subject to less wear and is more free-running.

The carrier element 60 includes a carriage 62 with four wheels 64, two of which ride in each of the grooves 65 of the tracks 48 and 50. The wheels 64 are rotatably mounted, preferably by ball bearings 66, on axles 67 which are mounted on the carriage 62. The carrier element 60 also includes a depending ring whose integral shank 72 is rotatably mounted in the bearing 74 which is integrally formed in the central portion of the carriage 62. The ring 70 is thus free to rotate and to traverse the length of the track means 40 with the shank 72 traveling along the slot formed between the flanges 52 and 54.

Connected to the ring 70 and extending downward therefrom is the resilient means 76 preferably a spiral spring, and the lower end thereof is provided with hose engaging means 78 which secures the lower end of means 30 to the hoses 30.

In operation, when the tractor 13 and trailer 22 are in line the carrier element tends to locate itself in the central area of the track means 40 as a result of the equilibrium of forces on the hoses 30. When the trailer is in a full right angle position, for example beyond that shown in FIGURE 1, a vertical corner 32 will contact the hoses 30 which will pull the carrier element 60 over to the left as viewed in FIGURE. 1. Positioning of the trailer to the left of the trailer, at the right angle, will cause the vertical corner 34 to contact the hoses 30 and pull the carrier element over to the right as viewed in FIGURE 1. The free reciprocation of the carrier element provides for accommodation to all tractor-trailer angular displacements without undesirable tension or abrasion of the hoses 30.

I wish it to be understood that I do not desire to be limited to the exact details of construction shown and described for obvious modifications will occur to a person skilled in the art to which it relates.

I claim:

1. In a tractor-trailer hose interconnection structure having first hase connecting means on the tractor and second hose connecting means on the trailer, and a hose extending between said first and second connecting means, the improvemet comnprising:

(a) track means extending substantially across said tractor
   (b) a carrier element movable along said track means
   (c) hose engaging means and (d) resilient means interconnecting said hose engaging means whereby upon said trailer angularly shifting its position relative to said tractor, said carrier element shifts its position along said track means, resiliently elevating said hose to position the hose out of the way to avoid damage to said hose.

2. Structure as claimed in claim 1 in which the tractor has a cab and the track means are supported by said cab.

3. Structure as claimed in claim 2 in which the track means is disposed above said cab.

4. Structure as claimed in claim 1 in which the track means are of substantially inverted U-shape.

5. Structure as claimed in claim 4 in which the track means is disposed at a downward angle with respect to the tractor.

6. Structure as claimed in claim 1 in which the carrier element is rotatable about its own axis.

References Cited

UNITED STATES PATENTS

| | | | |
|---|---|---|---|
| 2,619,888 | 12/1952 | Young et al. | 248—51 X |
| 2,730,183 | 1/1956 | Svoboda | 280—421 X |
| 2,984,445 | 5/1961 | Dobrikin | 248—51 X |
| 3,208,769 | 9/1965 | Onori | 280—421 |
| 3,218,010 | 11/1965 | Kapota | 248—51 |

LEO FRIAGLIA, *Primary Examiner.*

U.S. Cl. X.R.

137—351; 248—51